(12) United States Patent
Hartmann et al.

(10) Patent No.: US 8,689,341 B1
(45) Date of Patent: Apr. 1, 2014

(54) ANTI-PHISHING SYSTEM BASED ON END USER DATA SUBMISSION QUARANTINE PERIODS FOR NEW WEBSITES

(75) Inventors: Alfred C. Hartmann, Round Rock, TX (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1374 days.

(21) Appl. No.: 12/124,999

(22) Filed: May 21, 2008

(51) Int. Cl.
H04L 29/06 (2006.01)

(52) U.S. Cl.
USPC ............................... 726/26; 726/24; 713/188

(58) Field of Classification Search
USPC ...................................................... 726/24, 26
See application file for complete search history.

(56) References Cited

U.S. PATENT DOCUMENTS

| | | | |
|---|---|---|---|
| 7,797,421 B1 | 9/2010 | Scofield et al. | |
| 7,854,001 B1 * | 12/2010 | Chen et al. | 726/22 |
| 2004/0111632 A1 * | 6/2004 | Halperin | 713/200 |
| 2004/0215977 A1 * | 10/2004 | Goodman et al. | 713/201 |
| 2005/0238005 A1 * | 10/2005 | Chen et al. | 370/389 |
| 2005/0262559 A1 * | 11/2005 | Huddleston | 726/22 |
| 2006/0212925 A1 * | 9/2006 | Shull et al. | 726/1 |
| 2007/0192855 A1 * | 8/2007 | Hulten et al. | 726/22 |
| 2007/0220595 A1 | 9/2007 | M'raihi et al. | |
| 2008/0189408 A1 * | 8/2008 | Cancel et al. | 709/224 |
| 2008/0288303 A1 | 11/2008 | Gray et al. | |

OTHER PUBLICATIONS

Official Action received from USPTO dated Jul. 29, 2011 for U.S. Appl. No. 12/155,352, filed May 5, 2008.
Official Action received from USPTO dated Jan. 25, 2011 for U.S. Appl. No. 12/155,352, filed May 5, 2008.

* cited by examiner

*Primary Examiner* — Mohammad L Rahman
(74) *Attorney, Agent, or Firm* — Brill Law Office; Jeffrey Brill

(57) ABSTRACT

Quarantine periods longer than anticipated working lifetimes for phishing websites are used to protect users from phishing attacks. A central server or the like receives data indicating user attempts to submit confidential information to websites from a plurality of user computers. The received data is aggregated, and used to track website activity concerning solicitation of confidential information. The central server acquires and maintains current statistical data concerning phishing website lifetimes. The aggregated data concerning attempts by users to submit confidential information to websites and the current statistics concerning phishing website lifetimes are used to determine appropriate quarantine periods for websites, which can be enforced when users try to transmit confidential information to these websites.

16 Claims, 3 Drawing Sheets

__US 8,689,341 B1__

ANTI-PHISHING SYSTEM BASED ON END USER DATA SUBMISSION QUARANTINE PERIODS FOR NEW WEBSITES

TECHNICAL FIELD

This invention pertains generally to computer security, and more specifically to protecting users against phishing websites.

BACKGROUND

Computer users are often victimized by phishing attacks, in which they unknowingly provide personal and confidential information to malicious websites. Phishing is an attempt to criminally and fraudulently acquire sensitive information, such as usernames, passwords and credit card details, by masquerading as a trustworthy entity in an electronic communication. Phishing attacks are commonly made by sending fraudulent emails or instant messages, and enticing users to click on a link and submit personal information to what appears to be a legitimate website.

Existing anti-phishing solutions use databases of known, active phishing sites in combination with end-user heuristic based techniques to determine whether a web site which is requesting information is trustworthy. Such database information is often not available to these solutions until hours or days after a phishing site goes live. The reason for this delay is that it often takes a period of time for a new phishing site to be discovered, and then for identifying information to be distributed to security software publishers and made available to their users. During this period of time, users may unknowingly expose their personal information to a malicious website without any warnings from their installed anti-phishing solution.

Additionally, heuristic detection approaches are becoming less effective as phishers become better at replicating original sites. Furthermore, phishing sites that do not imitate authentic sites, such as fake stores, are even more difficult to detect. Once a phishing site is discovered, new protections are provided to anti-phishing solutions to ensure users are protected until the site is shut down.

Because there can be a gap between the launch of a new phishing site and its detection, phishing attacks can succeed by producing a large number of phishing sites quickly, even where each site only collects confidential information concerning a few thousand users before being shut down. It would be desirable to robustly protect users from such phishing attacks.

SUMMARY

Quarantine periods longer than anticipated working lifetimes for phishing websites are used to protect users from phishing attacks. A central server or the like receives data indicating user attempts to submit confidential information to websites from a plurality of user computers. The received data is aggregated, and used to track website activity concerning solicitation of confidential information. The central server acquires and maintains current statistical data concerning phishing website lifetimes. The aggregated data concerning attempts by users to submit confidential information to websites and the current statistics concerning phishing website lifetimes are used to determine appropriate quarantine periods for websites, which can be enforced when users try to transmit confidential information to these websites. That way, attempts to submit confidential information to a new website are held until after the expiration of the quarantine period, which is longer than the life of a relevant phishing site. Thus, if the new website is being used to launch a phishing attack, it will no longer be online when the confidential information is transmitted. On the other hand, if the website is legitimate, the quarantine period is still short enough not to substantially interfere with the user's e-commerce experience.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
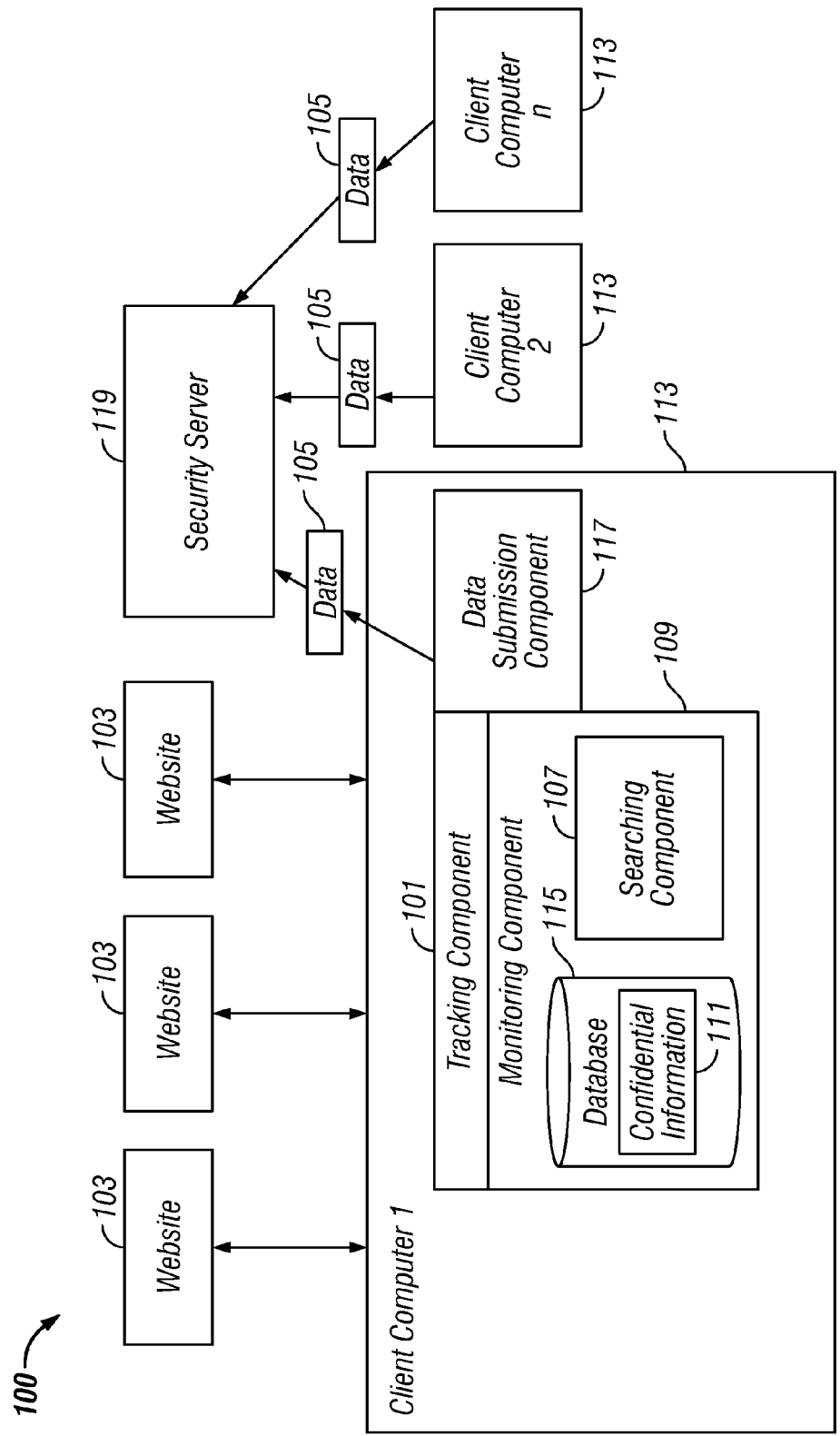
FIG. 1 is a block diagram illustrating a system for transmitting data concerning end user attempts to submit confidential information to a central server for statistical analysis, according to some embodiments of the present invention.

FIG. 1 illustrates system 100 for transmitting data 105 concerning end user attempts to submit confidential information 111 to websites 103 to a central server 119 for tracking analysis, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger, program, as a plurality of separate programs, as a kernel loadable module, as one or more device drivers or as one or more statically or dynamically linked libraries.

As illustrated in FIG. 1, a tracking component 101 tracks websites 103 visited by a user. Individual tracking components 101 run on each of a plurality of user computers 113. FIG. 1 illustrates three user computers 113 as an example, but it is to be understood that typically the number would be much larger, so that a statistically accurate database 217 of information submission attempts to websites 103 can be maintained. In one embodiment, the tracking component 101 is implemented as a web browser plug-in that is capable of tracking user browsing history. In other embodiments, the tracking component 101 can be implemented in other ways, for example as an HTTP/HTTPS proxy (local or remote, configured or transparent), or as a component that parses a user's web browser history. The implementation mechanics of tracking websites 103 visited by users is within the skill set of those of ordinary skill in the relevant art, and the usage thereof within the context of the present invention will be readily apparent to one of such a skill level in light of this specification.

A monitoring component 109 monitors attempts by the local user to transmit confidential information 111. The monitoring component 109 consists of both a secure (e.g., encrypted) database 115 (or other suitable storage mechanism) for storing the confidential information 111, and a searching component 107 for searching outbound network traffic for occurrences of this confidential data 111. In one embodiment, the searching component 107 is implemented as a web browser plug-in, but it can also be implemented in other ways, such as a HTTP/HTTPS proxy (local or remote, configured or transparent).

The implementation mechanics of storing confidential information 111 and searching outbound network traffic for confidential information 111 are within the skill set of those of ordinary skill in the relevant art, and the usage thereof within the context of the present invention will be readily apparent to one of such a skill level in light of this specification. It is to be understood that what information is considered to be confidential is a variable design parameter. In different embodiments, specific data and types of information can be classified as confidential by users, system administrators, publishers of security software and/or other parties as desired. In some embodiments, the stored confidential information 111 can additionally comprise data patterns, such as 16-digit credit card numbers or descriptors for password or PIN fields, birthdates, mother's maiden names, and so on, within forms, etc. This provides the option to not only protect explicitly registered and stored confidential information 111, but also data items that parsing rules or recognition logic would flag as being potentially sensitive.

The monitoring component 109 works in conjunction with the tracking component 101 to determine what sites 103 are visited and what confidential information 111 the user attempts to transmit to each visited site 103. As illustrated, a data submission component 117 submits this data 105 to a central repository for tracking analysis, as described in greater detail below.

In one embodiment, the data submission component 117 transmits the data 105 to a central computer security server 119, which receives such data 105 from each of the plurality of user computers 113. To maintain user privacy, the data 105 transmitted to the server 119 can be kept anonymous. To this end, user identifying information can be omitted, as a general summary of the submitted confidential information 111 is sufficient for tracking purposes. For example, the data 105 summarizing an attempt to submit confidential information 111 could be in a format such as "attempt to submit 1 VISA numbers, 1 pin number, 1 social security number, 1 name, 1 address, 2 phone numbers, 1 DOB to amazon.com."

Figure 2:
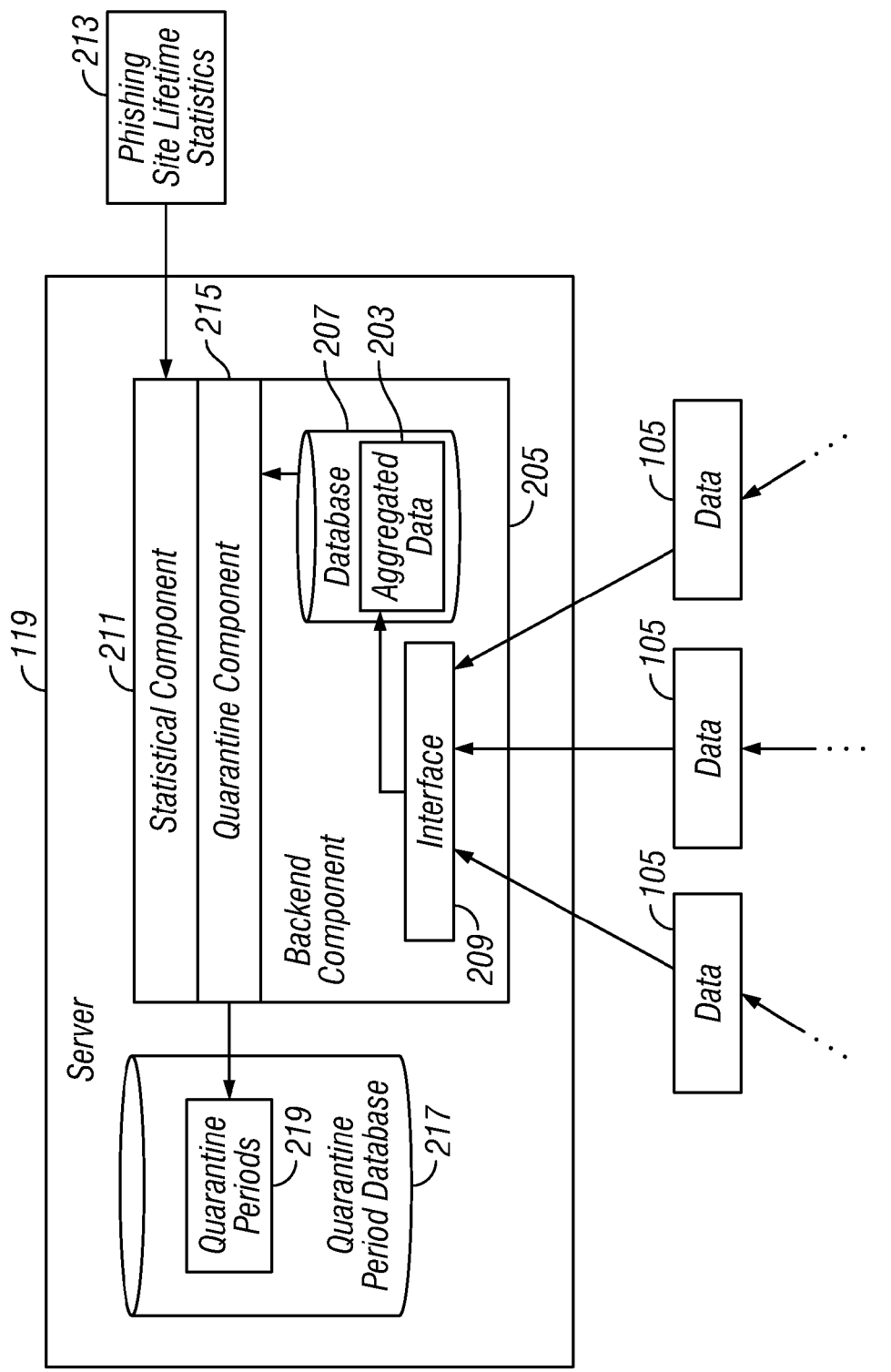
FIG. 2 is a block diagram illustrating a system for determining appropriate quarantine periods for websites, according to some embodiments of the present invention.

Turning now to FIG. 2, a backend component 205 running on the server 119 collects data 105 transmitted by the plurality of user computers 113. The backend component 205 typically comprises a large database (or other suitable storage mechanism) 207, and a well defined interface 209 that allows the data submission components 117 running on user computers 113 to submit data 105. The backend component 205 aggregates the data 105 submitted from the various user computers 113, and stores the aggregated data 203 in the database 207 for tracking analysis as described below. When the aggregated data 203 originates from a sufficiently large population of client computers 113, it enables the tracking (with reasonable statistical accuracy) of when a given website 103 begins requesting confidential information 111. As described in greater detail below, this information can be used to mark the beginning of quarantine period 219. Note that this defeats the evasion tactic in which a website 103 operates legitimately for a period of time, without requesting confidential information 111, before beginning to phish for confidential information 111.

Both website domain and IP address data 105 are collected and tracked, as phishing syndicates are adept at decoupling domains from IP addresses (i.e., a single domain can be fast fluxed over many IP addresses, and a single IP address can serve several phishing domains). In fact, phishing websites 103 are often so short lived that phishing syndicates exploit DNS cache lifetimes to extend site working life, so it is useful to know domain/IP address associations used at a client level, to potentially quarantine both domains and IP addresses.

As illustrated in FIG. 2, a statistical component 211 acquires and maintains phishing website working lifetime statistics 213. These statistics 213 can be available from many sources (not illustrated), such as the AntiPhishing Working Group and phishing website blacklist providers, such as PhishTank, Castle Cops, Google, etc. As of mid-2007, median phishing site lifetimes were measured from the tens of hours, up to a couple hundred hours for fast flux domains.

A quarantine component 215 utilizes the above-discussed phishing website working lifetime statistics 213 and the aggregated confidential information submission intent data 203 to determine statistically robust policy-based quarantine periods 219 for websites 103. By analyzing the most up to date phishing website working lifetime statistics 213 maintained by the statistical component 211 and the aggregated submission intent data 203, the quarantine component 215 can effectively calculate quarantine periods 219 for target websites 103 with suitable confidence levels for preventing the submission of confidential information 111 to phishing sites 103. In other words, the quarantine component 215 uses the aggregated submission intent data 203 to track the submission intent history of a given website 103, and the phishing lifetime statistics 213 to use that history so as to calculate a quarantine period 219 for that website 103 longer than the anticipated effective lifetime of relevant phishing site 103. It is to be understood that the aggregated confidential information submission intent data 203 can indicate when users first started attempting to submit confidential information 111 to a given website 103, and to track further attempts to submit confidential information 111 to that site 103 over time. Note that the phishing website working lifetime statistics 213 can indicate working lifetimes of phishing websites 103 with great degrees of particularity for specific types of phishing sites 103, or simply indicate working lifetimes of phishing websites 103 more generally.

In one embodiment, statistically good fits for phishing site 103 lifetimes are determined as cumulative probability distributions to lognormal curves or other representative distributions. In other embodiments, appropriate non-parametric statistical methods are employed. Various forms and methodologies of utilizing statistical analysis to determine appropriate quarantine periods 219 will be readily apparent to those of ordinary skill in the relevant art in light of the present specification. It is to be understood that the forms of statistical analysis described above are simply examples. Given the brief working lifetimes of phishing sites 103 (tens to hundreds of hours), the quarantine periods 219 should not unduly restrict end users from conducting normal e-commerce activities. In any case, the quarantine component 215 determines appropriate quarantine periods 219 for new websites 103 receiving confidential information 111 from users, and then stores these quarantine periods 219 such that they can be accessed from the end user machines 113 (e.g., in a quarantine database 217 as illustrated).

Figure 3:
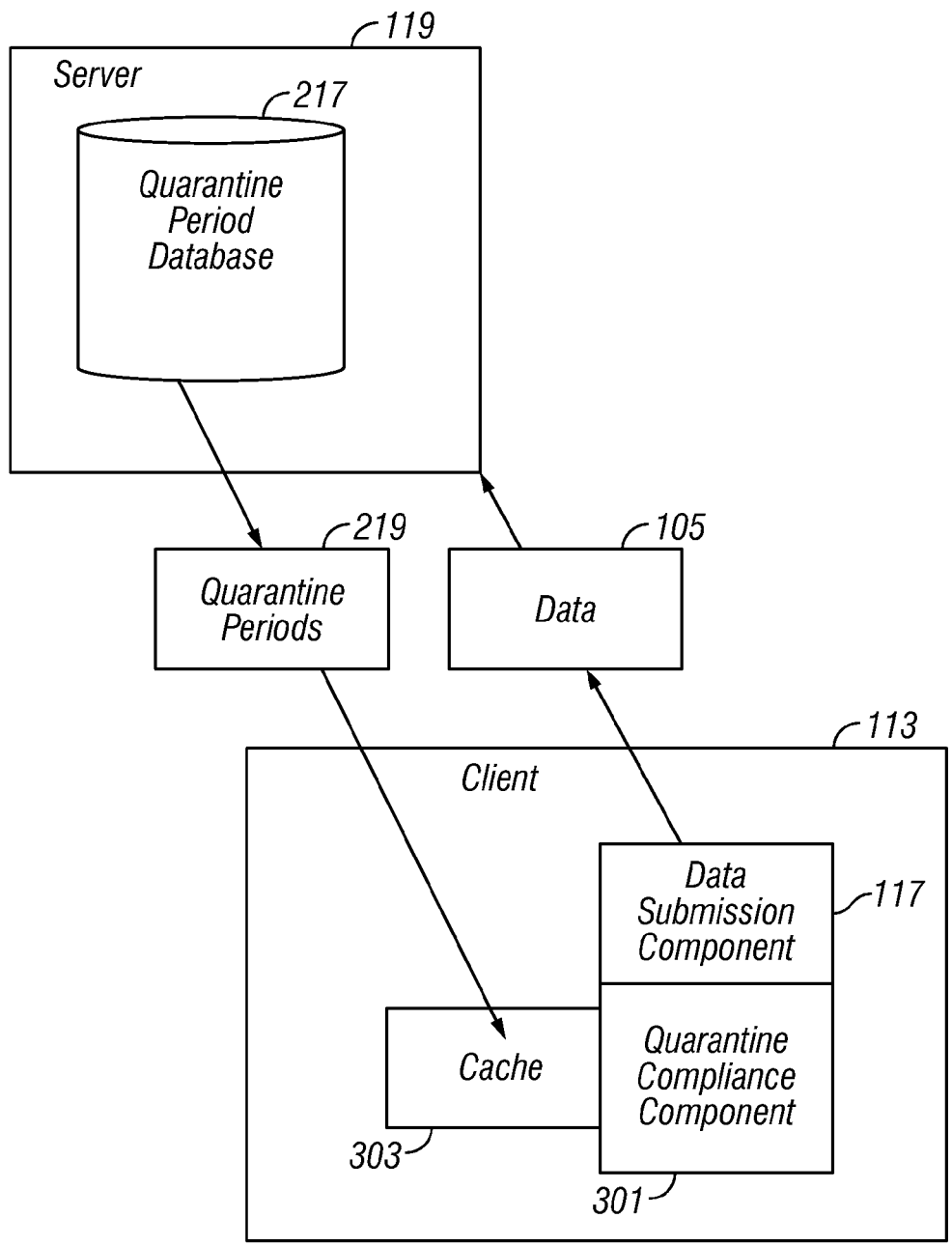
FIG. 3 is a block diagram illustrating a system for enforcing website quarantine periods, according to some embodiments of the present invention.

As illustrated in FIG. 3, when the monitoring component 109 on a user's computer 113 detects an attempt by a user to transmit confidential information 111 to a website 103, not only is the corresponding intent data 105 submitted to the backend component 205 as discussed above, but in addition a quarantine compliance component 301 determines whether the target website 103 is under quarantine by accessing the quarantine database 217 on the server 119, and checking the quarantine periods 219 stored therein. In some embodiments, quarantine period information 219 is stored in a cache 303 on end user machines 113, so as to avoid delays caused by remotely accessing the quarantine database 217.

If the website 103 is no longer under quarantine (e.g., the quarantine period 219 has expired because the website 103 has been active and receiving confidential information 111 for a sufficiently long time), the transmission is not to be quarantined. If the website 103 has no corresponding record in the quarantine database 217, the transmission is placed in quarantine by default. (Note that data 105 concerning the user's intent to submit the confidential information 111 to the website 103 is transmitted to the backend component 205, and this information 105 is analyzed to create a quarantine period 219 for the website 103, as discussed above.)

Various actions can be taken where a user attempts to submit confidential information 111 to a website 103 while a quarantine period 219 is still in force. In such cases, the user typically expects a confirmation of the submission. Therefore, in one embodiment, the user can be alerted that a quarantine period 219 is in effect. In some embodiments, the displayed alert (not illustrated) can present the user with options such aborting the submission, delaying the submission until the end of the quarantine period 219, or overriding the quarantine period 219 (if the user has sufficient privileges, and is willing to assume the risks). In another embodiment, if a quarantine period 219 actively applies to the website 103, the transmission is simply held for the duration of the period, and then allowed to proceed.

Note that the quarantine database 217 can be pre-populated with a whitelist of known legitimate websites 103 (e.g., those that are heavily trafficked). This would eliminate unnecessarily burdening users with quarantine alerts for known good websites 103 when the anti-phishing service is newly inaugurated and the client population has just begun to feed data 105 to the server 119. In another embodiment, the anti-phishing service could passively accept client data 105 for an initial period of time before enforcing quarantine periods 219, so as to first populate the quarantine database 217.

These techniques create a statistical eco-system that is capable of tracking and estimating confidential information 111 submission histories for working websites. 103, and imposing appropriate quarantine periods 219 on confidential information 111 submissions that significantly exceeds the expected working lifetime of phishing sites 103. This effectively exploits the characteristic short life evasion tactic of phishing sites 103 as a fraud prevention mechanism. Phishing syndicates cannot evade this detection method, because it already constitutes their primary evasion tactic. Industrial scale phishing depends upon high site 103 turnover to maintain fraud volumes, in the face of site 103 shutdowns by enforcement agencies.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally; software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for preventing confidential information from being submitted to malicious websites, the method comprising the steps of:
  receiving, by a computer, data indicating attempts to submit confidential information to websites from a plurality of user computers;
  aggregating, by the computer, data received from the plurality of user computers;
  analyzing, by the computer, aggregated data to track website activity concerning solicitation of confidential information;
  maintaining, by the computer, current statistics concerning a duration of phishing website lifetimes;
  determining, by the computer, quarantine periods for websites to which users are attempting to submit confidential information, by performing statistical analysis on aggregated data indicating attempts to submit confidential information to websites and the current statistics concerning phishing website lifetimes, wherein performing statistical analysis further comprises determining statistically good fits for phishing site lifetimes as at least one of from a group consisting of: 1) cumulative probability distributions to lognormal curves, and 2) at least one other representative distribution, wherein the quarantine period is set to exceed the duration of phishing website lifetimes; and
  making, by the computer, the determined quarantine periods available to user computers, to quarantine attempts to submit confidential information to websites during associated quarantine periods.

2. The method of claim 1 wherein analyzing aggregated data further comprises:
   separately analyzing domain names and IP addresses.

3. The method of claim 1 wherein maintaining current statistics concerning phishing website lifetimes further comprises:
   at least periodically acquiring current statistics concerning phishing website lifetimes from at least one external source; and
   storing the acquired current statistics concerning phishing website lifetimes.

4. The method of claim 1 wherein performing statistical analysis further comprises:
   employing at least one non-parametric statistical method.

5. A computer implemented method for preventing confidential information from being submitted to malicious websites, the method comprising the steps of:
   detecting, by a computer, attempts by a user to submit confidential information to websites;
   responsive to each detected attempt, determining, by the computer, whether a target website is currently under quarantine for a given quarantine period, said given quarantine period having been determined by performing statistical analysis on aggregated data and current statistics concerning phishing website lifetimes, wherein performing statistical analysis further comprises determining statistically good fits for phishing site lifetimes as at least one of from a group consisting of: 1) cumulative probability distributions to lognormal curves, and 2) at least one other representative distribution, wherein the quarantine period is set to exceed a duration of phishing website lifetimes; and
   responsive to results of the determining step, performing, by the computer, at least one additional step to protect the user from submitting confidential information to a phishing website.

6. The method of claim 5 wherein determining whether a target website is currently under quarantine further comprises:
   accessing a collection of stored quarantine periods; and
   attempting to locate a quarantine period concerning the target website.

7. The method of claim 6 further comprising:
   responsive to not locating a quarantine period concerning the target website, quarantining the submission.

8. The method of claim 5 wherein performing at least one additional step to protect the user from submitting confidential information to a phishing website further comprises performing at least one step from a group of steps consisting of:
   responsive to determining that a target website is currently under quarantine, not allowing the submission to the target website to be transmitted until after a quarantine period has expired;
   responsive to determining that a target website is currently under quarantine, displaying an alert to a user indicating that the target website is under quarantine and that that the submission to the target website is not to be transmitted until after a quarantine period has expired;
   responsive to determining that a target website is currently under quarantine, displaying an alert to a user prompting them to provide input as to how to proceed, receiving input from the user, and proceeding as directed by the received input; and
   responsive to determining that a target website is not currently under quarantine, allowing the submission to the target website to be transmitted.

9. At least one non-transitory computer readable medium storing a computer program product for preventing confidential information from being submitted to malicious websites, the computer program product comprising:
   program code for receiving data indicating attempts to submit confidential information to websites from a plurality of user computers;
   program code for aggregating data received from the plurality of user computers;
   program code for analyzing aggregated data to track website activity concerning solicitation of confidential information;
   program code for maintaining current statistics concerning a duration of phishing website lifetimes;
   program code for determining quarantine periods for websites to which users are attempting to submit confidential information, by performing statistical analysis on aggregated data indicating attempts to submit confidential information to websites and the current statistics concerning phishing website lifetimes, wherein performing statistical analysis further comprises determining statistically good fits for phishing site lifetimes as at least one of from a group consisting of: 1) cumulative probability distributions to lognormal curves, and 2) at least one other representative distribution, wherein the quarantine period is set to exceed the duration of phishing website lifetimes; and
   program code for making the determined quarantine periods available to user computers, to quarantine attempts to submit confidential information to websites during associated quarantine periods.

10. The computer program product of claim 9 wherein the program code for analyzing aggregated data further comprises:
    program code for separately analyzing domain names and IP addresses.

11. The computer program product of claim 9 wherein the program code for maintaining current statistics concerning phishing website lifetimes further comprises:
    program code for, at least periodically, acquiring current statistics concerning phishing website lifetimes from at least one external source; and
    program code for storing the acquired current statistics concerning phishing website lifetimes.

12. The computer program product of claim 9 wherein the program code for performing statistical analysis further comprises:
    program code for employing at least one non-parametric statistical computer program product.

13. At least one non-transitory computer readable medium storing a computer program product for preventing confidential information from being submitted to malicious websites, the computer program product comprising:
    program code for detecting attempts by a user to submit confidential information to websites;
    program code for, responsive to each detected attempt, determining whether a target website is currently under quarantine for a given quarantine period, said given quarantine period having been determined by performing statistical analysis on aggregated data and current statistics concerning phishing website lifetimes, wherein performing statistical analysis further comprises determining statistically good fits for phishing site lifetimes as at least one of from a group consisting of: 1) cumulative probability distributions to lognormal curves, and 2) at least one other representative distribution, wherein the quarantine period is set to exceed a duration of phishing website lifetimes; and program code for responsive to results of the determining step, performing at least one additional step to protect the user from submitting confidential information to a phishing website.

14. The computer program product of claim 13 wherein the program code for determining whether a target website is currently under quarantine further comprises:

program code for accessing a collection of stored quarantine periods; and program code for attempting to locate a quarantine period concerning the target website.

15. The computer program product of claim 14 further comprising:

program code for, responsive to not locating a quarantine period concerning the target website, quarantining the submission.

16. The computer program product of claim 13 wherein the program code for performing at least one additional step to protect the user from submitting confidential information to a phishing website further comprises program code for performing at least one step from a group of steps consisting of:

responsive to determining that a target website is currently under quarantine, not allowing the submission to the target website to be transmitted until after a quarantine period has expired;

responsive to determining that a target website is currently under quarantine, displaying an alert to a user indicating that the target website is under quarantine and that that the submission to the target website is not to be transmitted until after a quarantine period has expired;

responsive to determining that a target website is currently under quarantine, displaying an alert to a user prompting them to provide input as to how to proceed, receiving input from the user, and proceeding as directed by the received input; and responsive to determining that a target website is not currently under quarantine, allowing the submission to the target website to be transmitted.

* * * * *